(12) United States Patent
Kim et al.

(10) Patent No.: US 11,753,722 B2
(45) Date of Patent: Sep. 12, 2023

(54) METHOD OF PREPARING NANOCOMPOSITE MATERIAL PLATED WITH NETWORK-TYPE METAL LAYER THROUGH SILICA SELF-CRACKS AND WEARABLE ELECTRONICS CARBON FIBER PREPARED THEREFROM

(71) Applicants: Jeonju University Office of Industry-University Cooperation, Jeonju-si (KR); Hun Jeong, Jeonju-si (KR)

(72) Inventors: Hong-gun Kim, Seoul (KR); Hun Jeong, Jeonju-si (KR); Leeku Kwac, Jeonju-si (KR); Seonghun Back, Jeollabuk-do (KR); Bobby Singh Soram, Jeonju-si (KR)

(73) Assignees: JEONJU UNIVERSITY OFFICE OF INDUSTRY-UNIVERSITY COOPERATION, Jeonju-si (KR); Hun Jeong, Jeonju-si (KR)

( * ) Notice: Subject to any disclaimer, the term of this patent is extended or adjusted under 35 U.S.C. 154(b) by 0 days.

(21) Appl. No.: 17/174,005

(22) Filed: Feb. 11, 2021

(65) Prior Publication Data
US 2021/0246558 A1 Aug. 12, 2021

(30) Foreign Application Priority Data

Feb. 11, 2020 (KR) .................. 10-2020-0016602
Feb. 17, 2020 (KR) .................. 10-2020-0019303

(51) Int. Cl.
*C23C 18/18* (2006.01)
*C23C 18/38* (2006.01)
(Continued)

(52) U.S. Cl.
CPC ...... *C23C 18/1893* (2013.01); *C23C 18/1657* (2013.01); *C23C 18/38* (2013.01);
(Continued)

(58) Field of Classification Search
CPC ............ C23C 18/1603; C23C 18/1605; C23C 18/1893; C23C 18/1657; C23C 18/1639;
(Continued)

(56) References Cited

U.S. PATENT DOCUMENTS 4,481,249 A * 11/1984 Ebneth ................ D04H 1/4234
428/300.1
4,592,929 A * 6/1986 Tubergen ............. H05K 3/381
427/244
(Continued)

FOREIGN PATENT DOCUMENTS

JP 4017477 B2 12/2007
JP 5400826 B2 1/2014
(Continued)

OTHER PUBLICATIONS

Hanna Ji et al., "Enhancement of Electrical Conductivity in Silver Nanowire Network for Transparent Conducting Electrode using Copper Electrodeposition", 2019, vol. 29, No. 5, Korean J Mater Res. Daejon, Republic of Korea.

*Primary Examiner* — Katherine A Bareford
(74) *Attorney, Agent, or Firm* — Bridgeway IP Law Group, PLLC; Sang Ho Lee; Hyun Woo Shin (57) ABSTRACT

Provided is a method of preparing a nanocomposite material plated with a network-type metal layer through silica self-cracks and a wearable electronics carbon fiber prepared therefrom. The present disclosure provides a nanocomposite material having excellent electrical conductivity and bending resistance by plating a network-type metal layer on a substrate having a flat surface and/or a curved surface
(Continued)

through a method of preparing the nanocomposite material in which the network-type metal layer is plated on silica self-cracks by applying a silica coating solution on the substrate having a flat or curved surface, performing drying after the applying of the silica coating solution to form the silica self-cracks having random crack directions and sizes, and performing electroless metal plating on the surface of the substrate. Further, the present disclosure provides a wearable electronics carbon fiber having excellent electrical conductivity and bending resistance.

3 Claims, 6 Drawing Sheets

(51) Int. Cl.
*B82Y 30/00* (2011.01)
*B82Y 40/00* (2011.01)
*C23F 1/10* (2006.01)
*C23C 18/16* (2006.01)

(52) U.S. Cl.
CPC ............... *C23F 1/10* (2013.01); *B82Y 30/00* (2013.01); *B82Y 40/00* (2013.01)

(58) Field of Classification Search
CPC ............ C23C 18/1644; C23C 18/1689; C23C 18/1882; C23C 18/1889; C23C 18/38; C09K 13/02; B82Y 30/00; B82Y 40/00; C23F 1/10
See application file for complete search history.

(56) References Cited

U.S. PATENT DOCUMENTS

| | | | |
|---|---|---|---|
| 7,172,822 B2 * | 2/2007 | Shibata | H01L 51/5203 313/309 |
| 2013/0072077 A1 * | 3/2013 | Steiner, III | B82Y 40/00 442/59 |
| 2013/0273460 A1 * | 10/2013 | Moon | H01M 4/625 429/532 |
| 2014/0326697 A1 * | 11/2014 | Carnahan | H01L 31/0224 216/18 |
| 2016/0009928 A1 * | 1/2016 | Kulkarni | B05D 1/02 428/155 |

FOREIGN PATENT DOCUMENTS

| | | |
|---|---|---|
| KR | 10-2011-0027752 A | 3/2011 |
| KR | 10-2012-0029752 A | 3/2012 |

* cited by examiner

METHOD OF PREPARING NANOCOMPOSITE MATERIAL PLATED WITH NETWORK-TYPE METAL LAYER THROUGH SILICA SELF-CRACKS AND WEARABLE ELECTRONICS CARBON FIBER PREPARED THEREFROM

CROSS-REFERENCE TO RELATED APPLICATION

The present application claims priority under 35 U.S.C. § 119 to Korean Application Nos. 10-2020-0016602 and 10-2020-0019303 filed on Feb. 11, 2020, and Feb. 17, 2020, respectively, the contents of which are incorporated by reference in their entirety.

BACKGROUND

1. Field of the Disclosure

The present disclosure relates to a method of preparing a nanocomposite material plated with a network-type metal layer through silica self-cracks and a wearable electronics carbon fiber prepared therefrom. More particularly, the present disclosure relates to a method of preparing a nanocomposite material plated with a network-type metal layer through silica self-cracks which has excellent electrical conductivity and bending resistance, and a wearable electronics carbon fiber prepared therefrom.

2. Discussion of Related Art

Recently, carbon fibers have been widely used in biosensors, electromagnetic wave shielding materials, and reinforcing materials due to excellent properties such as excellent thermal conductivity, heat resistance, electrical conductivity, and incombustibility. In particular, carbon fibers are useful in heat-related products such as water heaters, heating glass, and heaters, and thus continuous research thereon is being conducted.

Carbon fibers may efficiently convert electrical energy into thermal energy through resistance heating and have several advantages over the existing commercially available copper wires. Carbon fibers are known to have higher heating efficiency than conventional heating elements, reduce electromagnetic waves, and emit far-infrared rays useful for the human body.

However, carbon fiber is known to have a specific resistance of $10^{-3}$ Ω·cm, which is higher than a specific resistance of $1.68 \times 10^{-6}$ Ω·cm of the existing copper wire.

As methods of improving the electrical conductivity of carbon fibers, there is a method of mixing and applying a conductive material on a fiber surface or a spinning dope when carbon fiber is prepared, a method of forming a film with an organic copolymer, and a method of forming a metal film on a fiber surface. Among the methods, the method of forming a metal film on the fiber surface has an excellent electromagnetic wave shielding effect and enables mass processing.

In addition, an electroless plating method capable of forming a metal film on a fiber surface is a method in which a fiber surface is treated with a catalyst and a metal to be plated is attached onto a fiber through a substitution/reduction reaction with the catalyst. A thickness of a metal-plated film may be adjusted according to the concentration and temperature conditions of a plating solution, and a uniform metal film may be formed on a fiber, thereby providing excellent electrical conductivity and electromagnetic wave shielding performance.

In Korean J. Mater. Res. Vol. 29, No. 5 (2019), research is reported on a method of forming a copper nano/microwire network on a planar substrate through electroless copper plating using silica and an ununiform transparent electrode using the same.

In addition, Korean Patent Publication No. 10-2011-0027752 discloses a three-dimensional network-shaped carbon fiber structure formed of a carbon fiber having an average outer diameter of 100 nm to 300 nm, but it is reported that the carbon fiber structure has a three-network shape and electrical properties thereof are improved through a composite material mixed with silica as a matrix.

Japanese Patent No. 5400826 discloses a composite metal foil including a porous metal foil formed to have a two-dimensional network structure formed of metal fiber and a primer provided in at least a portion of an inner portion of pores of the porous metal foil and/or a peripheral portion of the pores of the porous metal foil. Here, a conductive substrate including an exfoliation layer with cracks formed in a surface thereof is provided, metal plating is performed on the cracks, and metal is precipitated along the cracks, thereby proving a porous metal foil having a two-dimensional network structure.

However, there have been cases in which a metal layer is introduced using silica or plating for preparing the conventional composite materials, but there has been no report on a method of preparing a nano/microwire network on a substrate having a curvature or a fine fibrous substrate.

Accordingly, an object of the present disclosure is to improve the physical properties of carbon fibers and implement suitable physical properties for wearable electronics. As a result, the present disclosure provides a method of preparing a nanocomposite material plated in which a network-type metal layer is plated on silica self-cracks through an etching process by applying a silica solution on a substrate having a flat or curved surface, performing drying after the coating to form the silica self-cracks having random crack directions and sizes, and performing electroless metal plating on the surface of the substrate. Then, it was confirmed that since a network-type metal layer can be plated on a substrate having a flat surface as well as a substrate having a curved surface using silica self-cracks, the obtained carbon fiber has excellent electrical conductivity and bending resistance and is suitable for use in wearable electronic.

SUMMARY OF THE DISCLOSURE

An object of the present disclosure is to provide a method of preparing a nanocomposite material plated with a network-type metal layer through silica self-cracks.

Another object of the present disclosure is to provide a wearable electronics carbon fiber prepared from the aforementioned prepared method and having electrical conductivity and bending resistance.

In order to achieve the above objects, the present disclosure provides a method of preparing a nanocomposite material plated with a network-type metal layer through silica self-cracks, the method including forming the silica self-crack by applying a silica coating solution on a substrate having a flat or curved surface, and after the applying, drying to form the silica self-cracks having random crack directions and sizes on the surface of the substrate; performing an electroless metal plating process on the surface of the substrate on which the silica self-cracks are formed, and performing an etching process after the electroless metal plating process.

The substrate may include both a substrate having a flat surface and a substrate having a curved surface, and the substrate may include carbon fiber.

In one embodiment of the present disclosure, the forming of the silica self-cracks may apply the silica coating solution at a coating speed of 10 nm/min to 100 mm/min and perform the drying at a drying temperature of 40° C. to 80° C. after the applying.

In another embodiment of the present disclosure, the electroless metal plating process may be performed for a plating time of 10 minutes to 30 minutes.

The etching process may be performed under conditions of a concentration of 1 mol to 3 mol of an etching solution and an etching time of 12 hours to 36 hours.

The present disclosure also provides a wearable electronics carbon fiber prepared from the above-described preparing methods and having electrical conductivity and bending resistance, the wearable electronics carbon fiber including a network-type metal layer having a nanowire or microwire form which is plated on silica self-cracks on a surface of carbon fiber, and the silica self-cracks includes random crack directions and sizes formed by applying silica coating on the carbon fiber and performing drying.

In one embodiment, the network-type metal layer may be plated at an interval of 1 μm to 1.5 μm.

DETAILED DESCRIPTION OF EXEMPLARY EMBODIMENTS

Hereinafter, the present disclosure will be described in detail.

Figure 1:
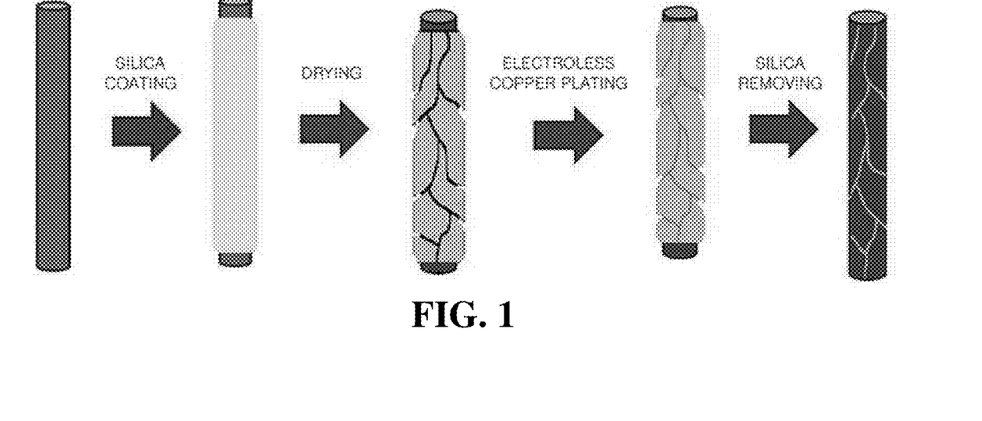
FIG. 1 is a flowchart showing a method of preparing a nanocomposite material plated with a network-type metal layer through silica self-cracks according to the present disclosure.

FIG. 1 is a flowchart for each process of a method of preparing a nanocomposite material plated with a network-type metal layer through silica self-cracks according to an embodiment of the present disclosure. More specifically, the present disclosure provides the method of preparing a nanocomposite material plated with a network-type metal layer through silica self-cracks including performing a silica self-crack forming process in which a silica coating solution is applied on a substrate having a flat or curved surface and dried after the applying to form silica self-cracks having random crack directions and sizes on a surface of the substrate, performing an electroless metal plating process on the surface of the substrate on which the silica self-cracks are formed, and performing an etching process after the electroless metal plating process.

The method of preparing a nanocomposite material according to the present disclosure is characterized in that a substrate having a curved surface as well as a substrate having a flat surface may be applied as the substrate without limitation. In the following descriptions of the embodiments of the present disclosure, since carbon fiber is used as the substrate, the substrate will be described as the carbon fiber shown in FIG. 1. However, the present disclosure can be understood as a substrate having a flat and/or curved surface.

1. Silica Self-Crack Forming Process on Carbon Fiber

In the method of the present disclosure, the silica self-crack forming process is a process in which the silica coating solution is applied on carbon fiber, and during drying after the applying, the silica self-cracks having random crack directions and sizes are formed.

In this case, the crack formation is influenced according to an appropriate concentration of the silica coating solution, and when the concentration is too thick or light, network-type cracks are not formed. In addition, in such a silica coating process, the optimization of conditions is required in order to form desired cracks while silica is entirely applied in an appropriate thickness on the carbon fiber and dried.

Figure 2:
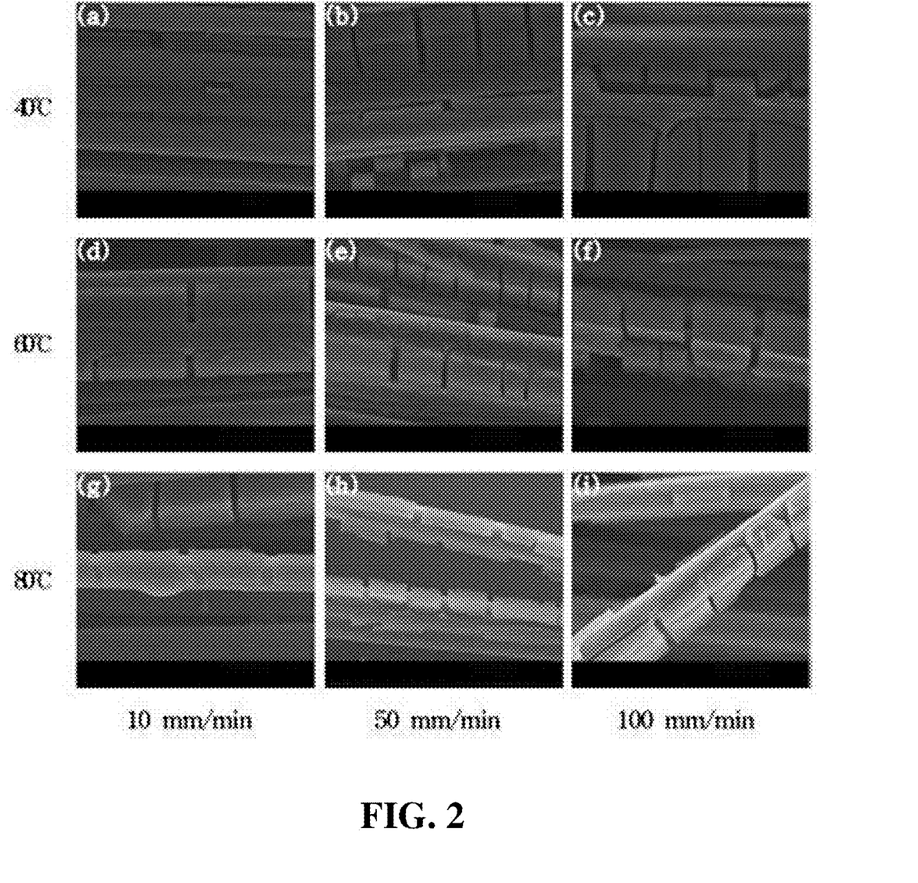
FIG. 2 shows results of a silica coating thickness according to silica coating speeds and drying temperatures in the method of the present disclosure.

FIG. 2 shows results of a silica coating thickness according to silica coating speeds and drying temperatures in the method of the present disclosure.

Figure 3:
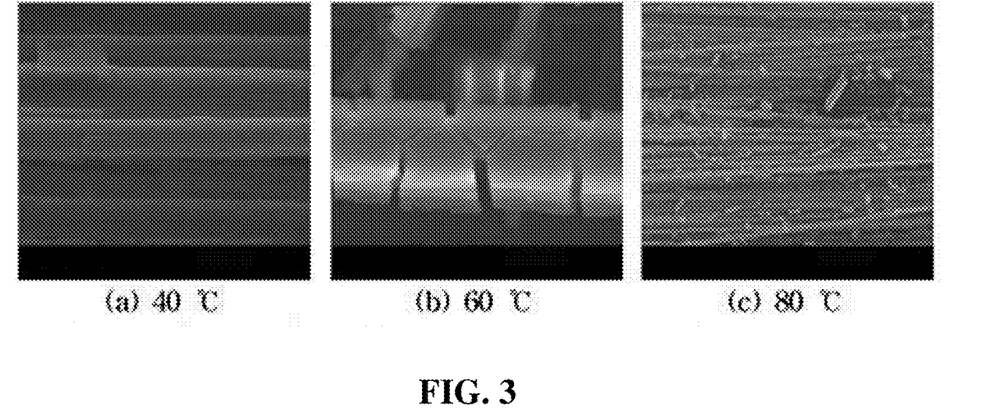
FIG. 3 shows scanning electron microscope (SEM) results of a silica self-crack state according to drying temperatures in the method according to the present disclosure.

FIG. 3 shows scanning electron microscope (SEM) results of a silica self-crack state according to drying temperatures. A silica coating state and crack formation are affected according to conditions of coating speeds (of 10, 50, and 100 mm/min) of a silica solution and drying temperatures (of 40, 60, and 80° C.) after the applying.

Desirably, the silica coating solution is applied on the carbon fiber at a coating speed of 10 mm/min to 100 mm/min. When the coating speed is less than 10 mm/min, since the coating speed is slow and a silica coating thickness is thin, cracks are not well-formed. On the other hand, when the coating speed exceeds 100 mm/min, silica is formed too thick, an interval between silica self-cracks is too wide, and the silica is easily separated.

In addition, drying is desirably performed in a drying temperature condition of 40° C. to 80° C. after the applying. When the drying temperature is less than 40° C., silica self-cracks are not well-formed on a dried surface, and when the drying exceeds 80° C., a dried silica coating layer is easily broken.

Thus, most preferably, when the silica coating solution is applied on the carbon fiber at a coating speed of 50 mm/min and a drying temperature of 60° C., it can be confirmed that a silica coating layer having a thickness of 1.79 μm is formed and silica self-cracks are formed at an interval of 2.03 μm.

2. Electroless Copper Plating Process

In the method of the present disclosure, an electroless plating solution used in the electroless metal plating process may be a material synthesized in an experiment or a commercial material. In an embodiment of the present disclosure, an electroless copper plating solution is used as an example.

Figure 4:
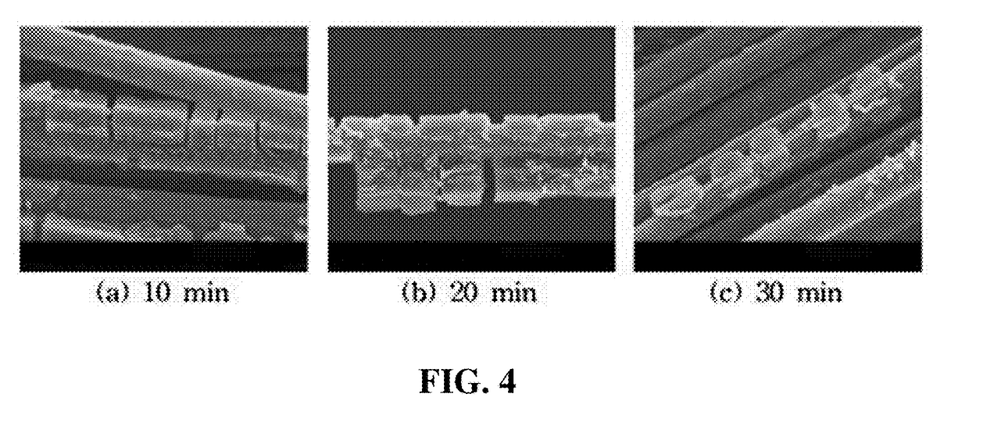
FIG. 4 shows results of analyzing a surface of a carbon fiber according to electroless plating times in the method of the present disclosure.

FIG. 4 shows results of analyzing a surface of a carbon fiber according to electroless plating times (of 10, 20, and 30 minutes) in the method of the present disclosure. When the plating time is too short, the plating may not be properly performed on the carbon fiber, and when the plating time is too long, the entire silica coating layer may be covered by a copper coating layer.

From the results of analyzing the surface according to copper plating times of FIG. 4, it can be confirmed that the diameter of the carbon fiber and the thickness of the copper plating layer is affected by an electroless copper plating time. Most preferably, when the plating time is 20 minutes, the copper plating layer having a thickness of 496.96 nm is uniformly formed on the entire carbon fiber.

3. Etching Process

In the method of the present disclosure, the etching process is a process of removing silica from the surface of the carbon fiber. In this case, a strong alkaline aqueous solution such as KOH, NaOH, or TMAH may be used as an etching solution to remove amorphous silica. The KOH solution is a material allowing water to easily permeate into the surface of the carbon fiber and a surface of the silica and may remove silica in an amorphous state.

Figure 5:
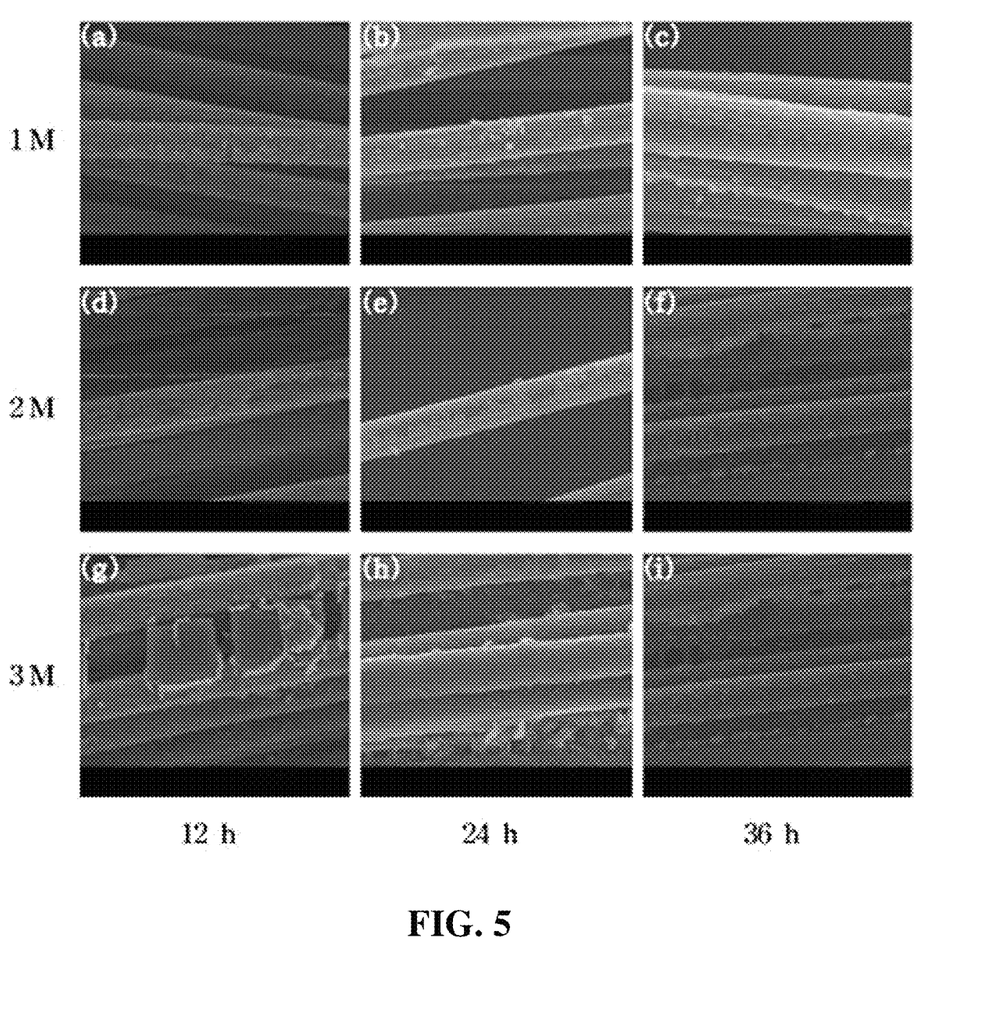
FIG. 5 shows results of analyzing a surface of a carbon fiber according to concentrations of an etching solution and etching times in the method of the present disclosure.

FIG. 5 shows results of analyzing a surface of a carbon fiber according to concentrations (of 1, 2, and 3 M) of potassium hydroxide (KOH) as an etching solution and etching times (of 12, 24, and 36 hours) in the method of the present disclosure. Most preferably, when etching is performed for 24 hours in a KOH solution having a concentration of 2 mol, it can be confirmed that the most excellent etching result is obtained.

In the method of preparing a nanocomposite material plated with a network-type metal layer according to the present disclosure through the above-described processes, network-type nano/micro plating may be performed on a curved shape of a substrate having a curved surface as well as a substrate having a flat surface through an electroless metal plating method.

In addition, a silica coating solution may be applied on carbon fiber and dried after the applying to form silica self-cracks having random crack directions and sizes on a surface of a substrate, and a network-type nano-metal layer is successfully formed on a surface of the fiber through an electroless metal plating method, thereby providing a nanocomposite fiber with improved electrical conductivity compared with common carbon fibers.

Accordingly, the present disclosure provides a wearable electronics carbon fiber having excellent electrical conductivity and bending resistance, which is prepared from the above-described preparation method and in which a network-type metal layer in the form of a nanowire or microwire is plated on silica self-cracks in a surface of carbon fiber including the silica self-cracks having random crack directions and sizes formed by applying a silica solution on the carbon fiber and performing drying after the applying.

Figure 6:
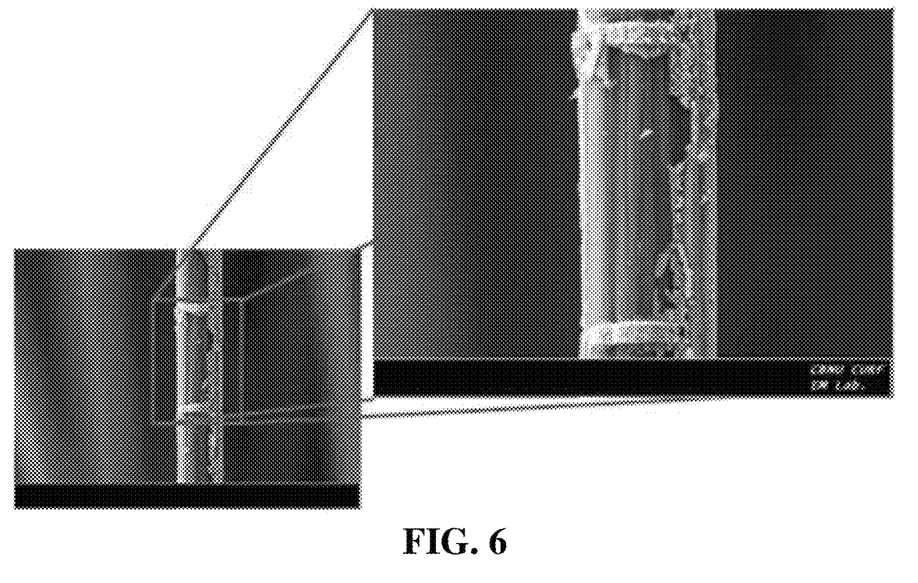
FIG. 6 shows results of analyzing a surface of a carbon fiber electroless-copper-plated through silica self-cracks of the present disclosure using a field emission (FE)-SEM.

FIG. 6 shows results of analyzing a surface of a carbon fiber electroless-copper-plated through silica self-cracks of the present disclosure using a field emission (FE)-SEM. The network-type metal layer is plated at an interval of 1 μm to 1.5 μm. It can be confirmed that copper is not plated on a portion of a carbon fiber coated with silica, and copper is plated on silica self-cracks.

Figure 7:
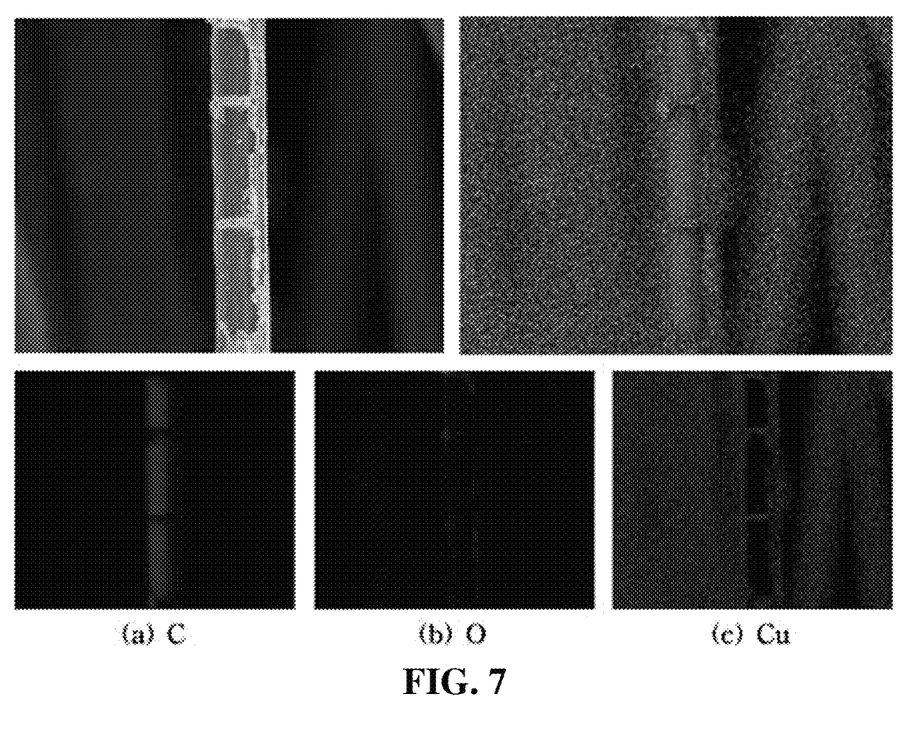
FIG. 7 shows mapping results of components of a carbon fiber electroless-copper-plated through silica self-cracks of the present disclosure through an energy dispersive X-ray spectrometer (EDS).
Figure 8:
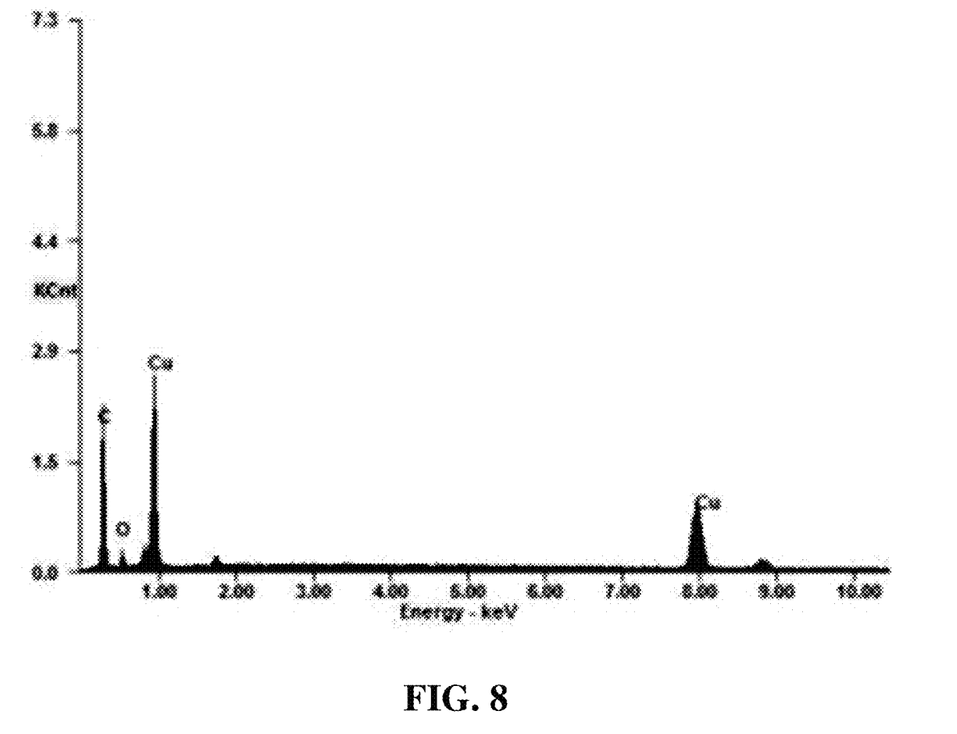
FIG. 8 is a graph showing an EDS component analysis of FIG. 7 in which carbon, oxygen and copper are denoted by peaks.

FIG. 7 shows mapping results of components of a carbon fiber electroless-copper-plated through silica self-cracks of the present disclosure through energy dispersive spectroscopy (EDS), and FIG. 8 is a graph showing an energy dispersive X-ray spectrometer component analysis in which carbon, oxygen, and copper are denoted by peaks.

The synthesis of a carbon fiber electroless-copper-plated through silica self-cracks can be confirmed from the components.

Figure 9:
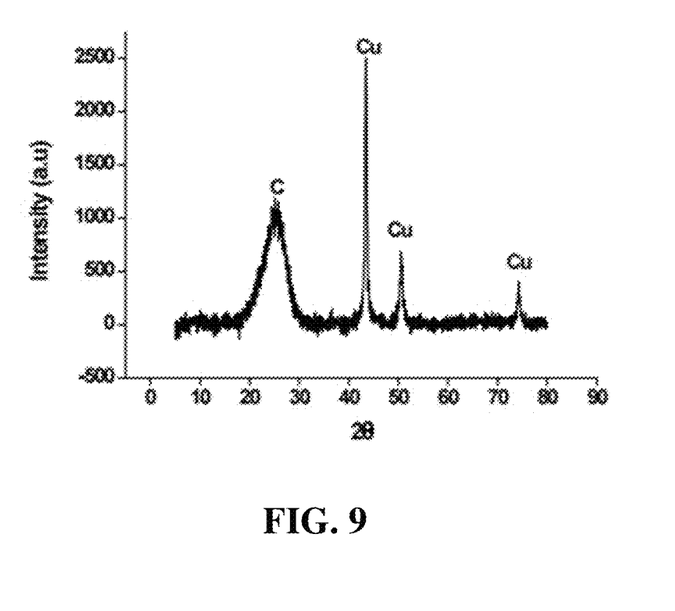
FIG. 9 shows X-ray diffraction analysis results of a carbon fiber electroless-copper-plated through silica self-cracks of the present disclosure.

In addition, FIG. 9 shows X-ray diffraction analysis results of a carbon fiber electroless-copper-plated through silica self-cracks of the present disclosure. A diffraction angle of 2 thetas of carbon and copper supports a result in which, during an etching process, silica is separated, and only plated copper remains on carbon fiber.

Figure 10:
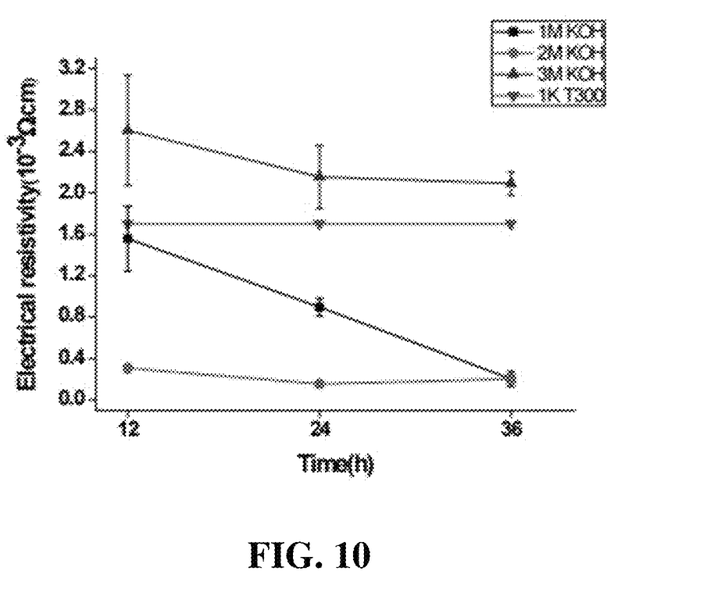
FIG. 10 shows results of measuring a change in electrical conductivity of a carbon fiber electroless-copper-plated through silica self-cracks of the present disclosure.

FIG. 10 shows results of measuring a change in electrical conductivity of a carbon fiber electroless-copper-plated through silica self-cracks of the present disclosure. A carbon fiber plated with a network-type metal layer obtained through the method of the present disclosure shows a result in which a specific resistance value thereof is about 10 times lower than that of common carbon fiber.

Figure 11:
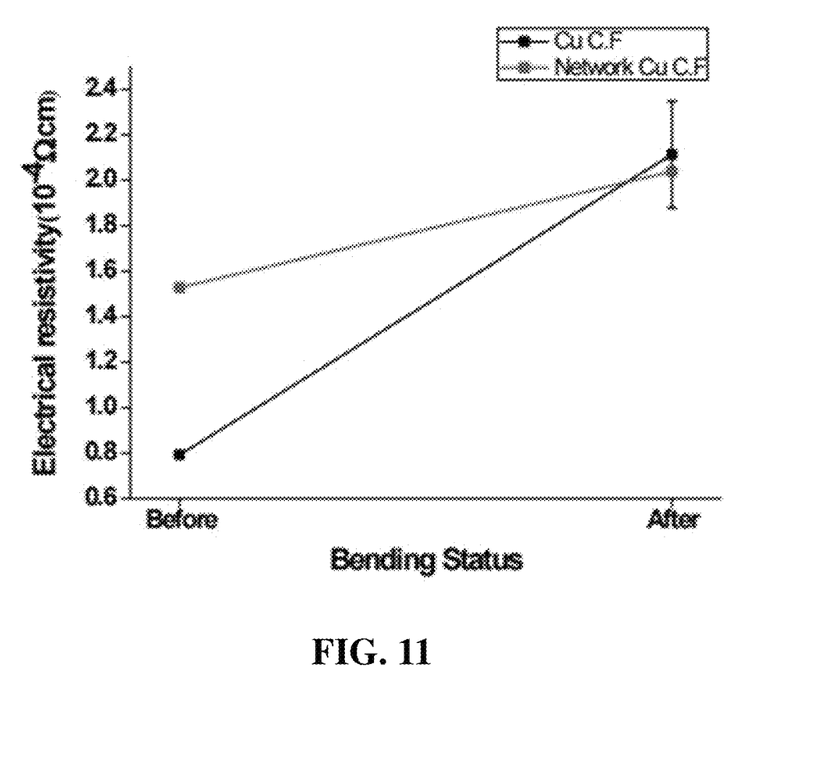
FIG. 11 shows results of a bending test of a carbon fiber electroless-copper-plated through silica self-cracks of the present disclosure.

FIG. 11 shows results of a bending test of a carbon fiber electroless-copper-plated through silica self-cracks of the present disclosure. As a result of analyzing the electrical conductivity of the carbon fiber before and after the bending test, the carbon fiber shows a low change rate of the electrical conductivity.

From the above results, in the case of a basic electroless copper-plated carbon fiber, a plated layer is disconnected due to a bending test, but since the carbon fiber electroless-copper-plated through silica self-cracks of the present disclosure is formed in a thin network type, even when one part is disconnected, a current can flow through the other part. Therefore, the carbon fiber electroless-copper-plated through silica self-cracks of the present disclosure is useful as a wearable electronics carbon fiber.

Hereinafter, the present disclosure will be described in more detail through Examples.

It is to be understood, however, that these examples are for illustrative purposes only and are not intended to limit the scope of the present disclosure.

Example 1

Step 1: Silica Self-Crack Forming Process on Carbon Fiber

A mixed solution of 1.5 ml of distilled water and 0.1 ml of hydrochloric acid was slowly added to a mixed solution of 3 ml of TEOS and 1.5 ml of ethanol and stirred for 50 minutes to prepare a silica coating solution.

A carbon fiber (T30 1K fiber manufactured by Toray Industries Inc) with a specimen length of 60 mm was prepared, immersed in the silica coating solution, and coated with silica.

In this case, in order to apply silica to a uniform thickness on an entire surface of the carbon fiber, a coating thickness of the silica was confirmed by performing immersion coating under a condition of a speed (coating speed) of 50 mm/min at which the carbon fiber was lifted. The interval and thickness state of self-cracks generated by performing drying at a drying temperature of 60° C. after applying silica were confirmed.

Step 2: Electroless Copper Plating Process

After silica was applied under the conditions of step 1 of Example 1, electroless copper plating was performed. Specifically, in the electroless copper plating, activation was performed in a tin chloride solution for 30 minutes, cleaning was performed, and then activation was performed for 30 minutes using palladium(II) chloride. In such a process, Sn/Pb nuclei are formed on the surface of the carbon fiber, and the Sn/Pb nuclei formed on the surface of the carbon fiber promote the electroless copper plating.

The electroless copper plating was performed under conditions of a temperature of 35° C., a pH of 10.5, and a plating time of 20 minutes using an electroless copper plating solution (ELC-250A (copper additive) and ELC-250B (pH adjuster) manufactured by Young-In Pachem).

Step 3: Etching Process

After silica was applied on the carbon fiber through step 2, an electroless copper plating layer was formed. Thereafter, the carbon fiber was immersed in a KOH solution, after a sufficient time passed, ultrasonication was performed for 5 minutes, a final waxing operation was performed with distilled water, and the carbon fiber was dried. In this case, etching was performed under conditions of a concentration of 2 mol of the KOH solution and an etching time of 24 hours. From the above operations, a carbon fiber electroless-copper-plated through silica self-cracks was prepared.

<Experimental Example 1> Surface Analysis According to Silica Coating Speed and Drying Temperature In order to establish optimum conditions of a silica self-crack forming process on a carbon fiber performed in step 1 of Example 1, by using an SEM with a magnification of ×3,000, the surface analysis was performed on a coating thickness of silica on the carbon fiber according to conditions of coating speeds (of 10, 50, and 100 mm/min) and drying temperatures (of 40, 60, and 80° C.) after the applying and was performed on an interval and thickness of self-cracks formed in the drying process.

1. Measurement Result of Coating thickness (μm) of Silica according to Silica Coating Speed and Drying Temperature Table 1 and FIG. 2 show results of a coating thickness of silica formed according to silica coating speeds and drying temperatures.

TABLE 1

| Coating speed | Drying temperature (° C.) | | |
|---|---|---|---|
| (mm/min) | 40 | 60 | 80 |
| 10 | 1.64 | 1.66 | 1.7 |
| 50 | 1.79 | 1.81 | 1.85 |
| 100 | 2.02 | 2.05 | 2.07 |

As can be seen from the results of Table 1 and FIG. 2, silica was applied to an average thickness of 1.67 μm under a condition of a coating speed of 10 mm/min, but self-cracks were not well generated. It is considered that due to a slow coating speed and a thin coating thickness of silica, self-cracks are not well generated. On the other hand, in the case of a coating speed of 50 mm/min, silica was applied to an average thickness of 1.82 μm on the entire carbon fiber. At a coating speed of 100 mm/min, silica was formed with an average of 2.05 μm which was too thick. In addition, it was confirmed that, due to a thick thickness of silica, an interval between silica self-cracks was wide and silica was well separated. In the case of an average thickness of silica for each temperature according to a coating speed, as a coating speed was increased, the thickness of silica was increased, and even when a drying temperature was increased, the thickness of silica was slightly increased.

The results are considered as a phenomenon in which, in a deep coating method, when a drying temperature is increased under a condition of 100 mm/min rather than 10 mm/min, during a drying process, silica solutions are agglomerated with each other at a thickened portion.

2. State Analysis of Silica Self-Cracks (μm) according to Drying Temperatures

TABLE 2

| Drying temperature | Coating speed (mm/min) | | |
|---|---|---|---|
| (° C.) | 10 | 50 | 100 |
| 40 | 1.85 | 1.91 | 1.97 |
| 60 | 2.03 | 2.07 | 2.13 |
| 80 | 2.21 | 2.25 | 2.28 |

Table 2 and FIG. 3 show state analysis results of silica self-cracks according to drying temperatures.

From the results of Table 2 and FIG. 3, it was confirmed that self-cracks were not well generated in a surface dried at a drying temperature of 40° C. (see (a) of FIG. 3), silica self-cracks were clearly formed in a surface dried at a drying temperature of 60° C. in carbon fiber (see (b) of FIG. 3), and a silica coating layer was easily broken in the case of performing drying at a temperature of 80° C. (see (c) of FIG. 3). That is, as the temperature was increased, an interval between silica self-cracks was increased.

<Experimental Example 2> Surface Analysis According to Electroless Copper Plating Times In order to establish optimum conditions of an electroless plating process performed in step 2 of Example 1, a surface of a carbon fiber according to conditions of electroless plating times (of 10, 20, and 30 minutes) was analyzed using an SEM with a magnification of ×3,000. Table 3 and FIG. 4 show images of a surface of a carbon fiber according to electroless plating times.

TABLE 3

Results of the diameter of carbon fiber and thickness of coating layer according to electroless copper plating times

| Electroless copper plating time | Diameter of carbon fiber (μm) | Thickness of coating layer (μm) |
|---|---|---|
| 10 | 7.27 | 439.05 |
| 20 | 7.51 | 496.96 |
| 30 | 7.66 | 606.89 |

From the results of Table 3, it was confirmed that as the plating time was increased, the diameter of carbon fiber and the thickness of the copper plating layer was also increased. In addition, FIG. 4, (a) shows a surface image obtained after an electroless copper plating time of 10 minutes after silica is applied to carbon fiber. From the results of FIG. 4, it was confirmed that a plating layer was not sufficiently formed on the entire carbon fiber.

On the other hand, (b) shows a surface image obtained after electroless copper plating is performed for 20 minutes. It was confirmed that a plating layer was formed on the entire carbon fiber and copper was plated between silica self-cracks. In this case, a copper plating layer having a thickness of 496.96 nm was uniformly formed on the entire carbon fiber.

In addition, (c) shows a surface image obtained after electroless copper plating is performed for 30 minutes. A result in which a silica coating layer was melted after 30 minutes was confirmed.

<Experimental Example 3> Surface Analysis According to Etching Process

In order to establish optimum conditions of an etching process performed in step 3 of Example 1, a surface of a carbon fiber according to conditions of etching solution concentrations (of 1, 2, and 3 mol) and etching times (of 12, 24, and 36 hours) was analyzed using an SEM with a magnification of ×3,000.

FIG. 5 shows results of analyzing a surface of a carbon fiber according to concentrations of an etching solution and etching times. In panels (a), (b), and (c), etching was performed at a concentration of 1 mol of KOH, and in panels (d), (e), and (f), etching was performed at a concentration of 3 mol of KOH for 12, 24, and 36 hours.

As a result, silica was separated as an etching time passed, and as the concentration was increased, the etching was quickly performed, but it was confirmed that the etching was not possible at a concentration of 3 mol of KOH. For that reason, it was confirmed that silica was melted to surround a carbon fiber, rather than the silica being etched and separated due to overreaction due to too many moles.

<Experimental Example 4> Surface Analysis Using FE-SEM

A surface of carbon fiber was analyzed on the electroless-copper-plated carbon fiber through silica self-cracks prepared in Example 1 using an FE-SEM.

FIG. 6 shows results of analyzing a surface of the carbon fiber electroless-copper-plated through silica self-cracks of the present disclosure using an FE-SEM, and a left image is captured at a magnification of ×5,000, and an enlarged right image shows a result analyzed at a magnification of ×10,000.

As a result, a network-type copper plating interval was in a range of 1 to 1.5 μm, and referring to FIG. 6, a copper was not plated on a portion of a carbon fiber coated with silica, and a copper was plated on silica self-cracks.

<Experimental Example 5> EDS Component Analysis and Mapping

Components of the carbon fiber electroless-copper-plated through silica self-cracks prepared in Example 1 were mapped through an element analyzer (EDS).

As shown in FIG. 7, (a), (b), and (c) shows that respective components are mapped. In (a) of FIG. 7, is a carbon component is indicated by a red color, in (b), an oxygen component is indicated by green color, and in (c), the copper component is indicated by yellow color.

FIG. 8 is a graph showing an EDS component analysis of FIG. 7 in which carbon, oxygen, and copper are denoted by peaks.

<Experimental Example 6> X-Ray Diffraction Analysis

In order to analyze a crystal structure and phase of the carbon fiber electroless-copper-plated through silica self-cracks prepared in Example 1, the presence or absence of silica was checked after an etching process through an X-ray diffractometer (XRD).

As a result, as shown in FIG. 9, a strong diffraction peak of carbon (C) has an experimental diffraction angle of 26.3° at 2 thetas (matches with a theoretical value in ICDD card number 08-0415) and corresponds to a crystal face (101), and a diffraction peak of copper (Cu) also has experimental diffraction angles of 43.5°, 50.5°, and 74.3° at 2 thetas (matches with theoretical values of JCPDS card number 04-0836) and corresponds to crystal faces (11, 20, and 20).

From the above results, through diffraction angles at 2 thetas of carbon and copper, it was confirmed that, during an etching process, silica was separated, and only plated copper remained on carbon fiber.

<Experimental Example 7> Electrical Conductivity Analysis

In order to check a change in electrical conductivity of the carbon fiber electroless-copper-plated through silica self-cracks prepared in Example 1, the specific resistance of the carbon fiber was measured, and values thereof are shown in Table 4 and FIG. 10 below.

TABLE 4

| Specific resistance value ($10^{-3}$ Ω · cm) according to the concentration of etching solution and etching time | | | |
|---|---|---|---|
| Etching time | 1M KOH | 2M KOH | 3M KOH |
| 12 | 1.5570 | 0.30052 | 2.6032 |
| 24 | 0.8963 | 0.1537 | 2.1531 |
| 36 | 0.2016 | 0.2009 | 2.0895 |

In the case of the carbon fiber used as a starting material (T30 1K fiber manufactured by Toray Industries Inc, Japan), a specific resistance value of $1.7 \times 10^{-3}$ Ω·cm was observed, and when etching was performed for 24 hours at a concentration of 2 mol of KOH, a specific resistance value of $1.537 \times 10^{-4}$ Ω·cm was observed. That is, a result in which a specific resistance value was about 10 times lower than that of existing carbon fiber was confirmed.

On the other hand, as confirmed from FIG. 10, when 3 mol of KOH was used, the specific resistance of the carbon fiber was measured and was high. From this result, at a concentration of 3 mol of KOH, silica and an OH group are not reacted to be etched, but overreaction occurs, and thus, it can be predicted that silica is melted to surround the carbon fiber.

<Experimental Example 8> Analysis of Bending Test

In order to check a change in electrical conductivity before and after a bending test of the carbon fiber electroless-copper-plated through silica self-cracks prepared in Example 1, the specific resistance of the carbon fiber was measured, and a specific resistance was measured after the bending test. A change in electrical conductivity before and after the bending test is shown in Table 5 and FIG. 11 below.

TABLE 5

| Specific resistance ($10^{-4}$ Ω·cm) before and after a bending test | | |
|---|---|---|
| Bending Test | Before | After |
| Cu C.F. | 0.793 | 2.113 |
| Example 1 (a network-type Cu C.F. | 1.528 | 2.038 |

From the above results, a basic electroless copper-plated carbon fiber had a specific resistance of $0.793\times10^{-4}$ Ω·cm and a specific resistance of $2.13\times10^{-4}$ Ω·cm after the bending test, which showed a high change rate of 16%.

On the other hand, the carbon fiber prepared in Example 1 had a specific resistance of $1.528\times10^{-4}$ Ω·cm and a specific resistance of $2.038\times10^{-4}$ Ω·cm after the bending test, which showed a low change rate of 3%.

From the above results, in the case of the basic electroless copper-plated carbon fiber, a plated layer is disconnected due to the bending test, but since the carbon fiber prepared in Example 1 is formed in a thin network type due to a thin plated layer, even when one part is disconnected, a current can flow through the other part.

According to a method of preparing a nanocomposite material plated with a network-type metal layer of the present disclosure, network-type nano/micro plating may be performed on a curved shape of a substrate having a curved surface other than a substrate having a flat surface through an electroless metal plating method.

Therefore, a silica coating solution is applied on carbon fiber and dried after the applying to form silica self-cracks having random crack directions and sizes on a surface of a substrate, and a network-type nano-metal layer is successfully grown on a surface of the fiber through an electroless metal plating method, thereby providing a nanocomposite fiber with improved electrical conductivity as compared with common carbon fibers.

In addition, the present disclosure can provide a wearable electronics carbon fiber resistant to bending by plating a network-type metal (copper) wire in the form of a nano/micro wire on a substrate having a curved surface other than a substrate having a flat surface.

Although only the specific embodiments of the present disclosure have been described, those skilled in the art will appreciate that various modifications, additions, and substitutions are possible, without departing from the scope and spirit of the disclosure as disclosed in the accompanying claims.

What is claimed is:

1. A method of preparing a composite material plated with a nano metal layer network through silica self-cracks, the method comprising:
    forming the silica self-cracks by applying a silica coating solution on a substrate comprising carbon fiber and having a curved surface, the carbon fiber having a specimen length of 60 mm, and after the applying the silica coating solution, drying to form the silica self-cracks having random crack directions and sizes on the surface of the substrate;
    performing an electroless copper plating process on the surface of the substrate on which the silica self-cracks are formed; and
    performing an etching process to remove the silica from the surface of the substrate after the electroless copper plating process, and forming the composite material plated with the nano metal layer network,
    wherein in the forming of the silica self-cracks, the silica coating solution is applied at a coating speed of about 50 mm/min and the drying is performed at a drying temperature of about 60° C.,
    wherein the electroless copper plating process is performed for a plating time of about 20 minutes,
    wherein the etching process is performed using KOH as an etching solution having a concentration of about 2 mol and an etching time of about 24 hours.

2. A method of preparing a composite material plated with a nano metal layer network through silica self-cracks, the method comprising:
    forming the silica self-cracks by applying a silica coating solution on a substrate comprising carbon fiber and having a curved surface, the carbon fiber having a specimen length of 60 mm, and after the applying the silica coating solution, drying to form the silica self-cracks having random crack directions and sizes on the surface of the substrate;
    performing an electroless copper plating process on the surface of the substrate on which the silica self-cracks are formed; and
    performing an etching process to remove the silica from the surface of the substrate after the electroless copper plating process, and forming the composite material plated with the nano metal layer network,
    wherein in the forming of the silica self-cracks, the silica coating solution is applied at a coating speed of about 50 mm/min and the drying is performed at a drying temperature of about 60° C., and after the silica coating solution is applied an the silica is dried, the applied silica has an average thickness of 1.81 μm and an average interval of the silica self-cracks is 2.07 μm,
    wherein the electroless copper plating process is performed for a plating time of about 20 minutes,
    wherein the etching process is performed using KOH as an etching solution having a concentration of about 2 mol and an etching time of about 24 hours.

3. A method of preparing a composite material plated with a nano metal layer network through silica self-cracks, the method comprising:
    forming the silica self-cracks by applying a silica coating solution on a substrate comprising carbon fiber and having a curved surface, the carbon fiber having a specimen length of 60 mm, and after the applying the silica coating solution, drying to form the silica self-cracks having random crack directions and sizes on the surface of the substrate;
    performing an electroless copper plating process on the surface of the substrate on which the silica self-cracks are formed; and
    performing an etching process to remove the silica from the surface of the substrate after the electroless copper plating process, and forming the composite material plated with the nano metal layer network,
    wherein in the forming of the silica self-cracks, the silica coating solution is applied at a coating speed of 50 mm/min and the drying is performed at a drying temperature of 60° C.,
    wherein the electroless copper plating process is performed for a plating time of 20 minutes,
    wherein the etching process is performed using KOH as an etching solution having a concentration of 2 mol and an etching time of 24 hours.

* * * * *